United States Patent [19]
Sato et al.

[11] Patent Number: 4,642,730
[45] Date of Patent: Feb. 10, 1987

[54] ELECTRICAL INSULATING OIL AND OIL-FILLED ELECTRICAL APPLIANCES

[75] Inventors: Atsushi Sato, Tokyo; Keiji Endo, Yokosuka; Shigenobu Kawakami, Ichikawa; Eiichi Matsuzaka, Kawasaki; Satoshi Narui, Ayase, all of Japan

[73] Assignee: Nippon Petrochemicals Company, Ltd., Japan

[21] Appl. No.: 760,402

[22] Filed: Jul. 30, 1985

[30] Foreign Application Priority Data

Aug. 3, 1984 [JP] Japan ............................ 59-163550

[51] Int. Cl.[4] ........................ H01G 4/22; H01B 3/22

[52] U.S. Cl. ............................ 361/315; 174/17 LF; 174/25 R; 174/25 C; 252/570; 336/94; 361/327; 585/6.3; 585/25; 585/470; 585/471; 585/472

[58] Field of Search .................. 252/570; 174/17 LF, 174/17 F, 25 C; 336/94; 361/315, 327; 585/6.3, 25, 470, 471, 472

[56] References Cited

U.S. PATENT DOCUMENTS

| | | | |
|---|---|---|---|
| 4,287,376 | 9/1981 | Shimizu et al. | 585/458 |
| 4,365,103 | 12/1982 | Chang et al. | 585/471 |

*Primary Examiner*—Robert A. Wax
*Attorney, Agent, or Firm*—Scully, Scott, Murphy & Presser

[57] ABSTRACT

An improved electrical insulating oil and oil-filled electrical appliances impregnated therewith. The electrical insulating oil can be produced inexpensively but has excellent electrical characteristics and it comprises a fraction having boiling points in the range of 350° to 450° C. that is prepared by disproportionating diarylalkane or a hydrocarbon mixture mainly containing the same at temperatures in the range of 20° to 500° C. in the presence of a disproportionation catalyst, said diarylalkane having boiling points in the range of 260° to 320° C.

23 Claims, No Drawings

ELECTRICAL INSULATING OIL AND OIL-FILLED ELECTRICAL APPLIANCES

BACKGROUND OF THE INVENTION (1) Field of the Invention

This invention relates to an electrical insulating oil and oil-filled electrical appliances which is impregnated with the same.

More particularly, the invention relates to an electrical insulating oil and oil-filled electrical appliances impregnated with the same where the electrical insulating oil comprises a heavier fraction which is prepared by disproportionating diarylalkane or a hydrocarbon mixture mainly containing diarylalkanes.

(2) Description of the Prior Art

Electrical appliances such as oil-filled capacitors and oil-filled power cables have recently been made small in size and light in weight. With this tendency, at least a part of the electrical insulating materials or dielectric materials is made of plastic materials like polyolefins such as polypropylene.

In the oil-filled electrical appliances, several improved measures are taken with regard to the structures of the electrical appliances, however, there have never been proposed any satisfactory electrical insulating oil to be used for impregnation. That is, the conventional electrical insulating oils such as refined mineral oils, polybutenes, alkylbenzenes, diarylalkanes, alkylbiphenyls and alkylnaphthalenes are not always satisfactory in their electrical characteristics. Among several kinds of oil-filled electrical appliances, especially, in metallized film capacitors (hereinafter referred to as "MF capacitors") in which a metal-deposited film that is prepared by depositing in vacuum a metal such as aluminum or zinc on a plastic film, is wound as an electrode and it is impregnated with an electrical insulating oil, there is scarcely proposed any electrical insulating oil suitable for impregnation.

In other words, presently used MF capacitors are mainly the so-called dry type MF capacitors in which an electrically insulating impregnation substance such as electrical insulating oil is not used. Not only in electric capacitors but also in general electrical appliances, the potential gradient can be made high by surrounding electrodes or electric conductors with an impregnating agent of electrical insulator. Accordingly, the voltage-withstanding level of the so-called impregnation-type MF capacitors can be made higher than that of dry-type ones, and it becomes possible to comply with the requirement to make them light and small. However, the metallized films having a base film of plastic such as polypropylene film, are liable to be influenced by impregnating oils. For example, when change in the size of base film due to the impregnation of an impregnating oil or permeation of the impregnating oil into the boundary between a deposited metallic layer and a base film, is caused to occur, cracks are formed in the deposited metallic layer and, what is worse in many cases, the metallic layer is peeled off to cause dielectric breakdown. Therefore, there are few electrical insulating oils which are suitable for use in MF capacitors.

Meanwhile, it is widely put into practice in the industry to produce ethylbenzene, ethyltoluene or cumene by alkylating benzene or toluene with ethylene or propylene in the presence of an alkylation catalyst. The ethylbenzene and ethyltoluene are dehydrogenated into styrene and vinyltoluene which are used as the monomers for producing styrene-type polymers. Cumene is used as a starting material for cumene-phenol process.

From the above alkylation process, a by-product oil fraction containing 1,1-diarylalkanes is obtained. It was proposed to use the fraction as an electrical insulating oil (U.S. Pat. No. 4,111,824).

The fraction proposed in the above reference, however, is not always satisfactory for use in oil-filled capacitors, especially, in MF capacitors even though it is available in large quantities at low cost.

Furthermore, it is proposed to use aromatic hydrocarbons such as distyrenated xylene as an electrical insulating oil which are heavier than diarylalkanes. However, the pour points and viscosities of heavier aromatic hydrocarbons are usually high and thus few of them are used practically.

BRIEF SUMMARY OF THE INVENTION

In view of the above-described conventional state of the art, it is the primary object of the present invention to provide an improved electrical insulating oil and oil-filled electrical appliances which are free from the above-described disadvantages in the conventional art.

Another object of the present invention is to provide an electrical insulating oil and oil-filled electrical appliances which insulating oil is quite suitable for use in impregnating electrical appliances in which at least a part of their insulating or dielectric material is made of plastics.

A further object of the present invention is to provide an electrical insulating oil which can made good use of the specific by-product oil fractions that are available inexpensively in large quantities.

That is, according to the present invention, the electrical insulating oil is characterized in that it comprises a fraction having boiling points in the range of 350° to 450° C. that is prepared by disproportionating diarylalkane or a hydrocarbon mixture mainly containing diarylalkanes having boiling points in the range of 260° to 320° C., at temperatures in the range of 20° to 500° C. in the presence of a disproportionation catalyst.

A preferable starting material as the above-mentioned hydrocarbon mixture mainly containing diarylalkanes is the by-product oil fraction that is obtained in the process to prepare an alkylated monocyclic aromatic hydrocarbon by alkylating a monocyclic aromatic hydrocarbon with an alkylation catalyst.

DETAILED DESCRIPTION OF THE INVENTION

The starting material used in the disproportionation of the invention comprises diarylalkanes represented by the following general formula (I) or a hydrocarbon mixture mainly containing the same. The boiling points of the above starting material are in the range of 260° to 320° C. and preferably 260° to 310° C. The boiling point higher than the above range is not desirable because the effect of the disproportionation cannot be expected. The general formula (I) is:

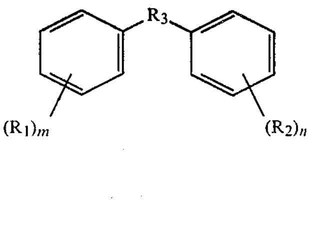

(I)

wherein each of $R_1$ and $R_2$ is a hydrogen atom or a straight chain or branched chain alkyl group; $R_3$ is a straight chain or branched chain alkylene group; and each of m and n is an integer from 0 to 3.

Exemplified as the above diarylalkanes are diphenylmethane, ditolylmethane, diphenylethane, phenyltolylethane, phenylethylphenylethane and ditolylethane.

The hydrocarbons used as the starting material according to the present invention is a by-product oil fraction containing diarylalkanes that is produced in a process to prepare alkylated monocyclic aromatic hydrocarbons by alkylating monocyclic aromatic hydrocarbons with olefins. Of course, a diarylalkane itself or a mixture of diarylalkanes can also be used as the starting hydrocarbons.

The monocyclic aromatic hydrocarbons used for this alkylation process are benzene and lower alkylbenzenes such as toluene and the olefins are lower olefins such as ethylene and propylene. As the alkylation catalysts mainly used in the industrial scale are Lewis acids such as aluminum chloride and boron fluoride, protonic acids such as phosphoric acid, and solid acids such as silica-alumina and synthetic zeolites that are typically represented by ZSM-5 type zeolite such as ZSM-5 and ZSM-11.

The above-mentioned alkylation is widely put into practice as preparation processes for lower alkylbenzenes such as ethylbenzene, ethyltoluene and cumene. Ethylbenzene and ethyltoluene that are produced by alkylating benzene and toluene with ethylene, are dehydrogenated into styrene and methylstyrene, respectively, and they are consumed in large quantities for producing styrene-type polymers.

An example of ethylbenzene preparation process will be described, in which benzene is alkylated with ethylene in the presence of aluminum chloride as an alkylation catalyst.

The molar ratio of the feed of benzene to ethylene is, for example, about 10:1 to about 3:1. In liquid phase alkylation, 0.005 to 0.030 part of catalyst is added to one part of ethylbenzene to be produced. The reaction is carried out generally at temperatures in the range of 90° to 150° C., pressures of 0.5 to 15 kg/cm$^2$ and durations of 20 minutes to 3 hours.

Through the above alkylation, unreacted benzene, aimed ethylbenzene, polyethylbenzenes such as diethylbenzene and triethylbenzene, and the by-product oil fraction containing diarylalkanes are obtained.

After the alkylation, the catalyst is removed by a conventional method. For example, the catalyst is separated by sedimentation in a settler, which is followed by neutralization and repeated water rinsing.

Then unreacted benzene (b.p. 80° C.), ethylbenzene (b.p. 136° C.) and polyethylbenzenes (b.p. 176° to 250° C.) are recovered by distillation from the alkylation product to obtain the by-product oil, as the remainder, containing diarylalkanes.

The by-product oil fraction that is especially preferable in the present invention is those which are obtained from the process to produce ethylbenzene or ethyltoluene by alkylating benzene or toluene with ethylene. This by-product oil fraction is substantially comprises diarylalkanes and can be obtained in large quantities at low cost. Furthermore, the effect of disproportionation of the invention can be produced markedly. Accordingly, it is desirable as the starting material to be used in the present invention.

In the present invention, the above-described starting material is subjected to disproportionation in the presence of a disproportionation catalyst.

The disproportionation catalysts are exemplified by Lewis acids such as aluminum chloride and ferric chloride, solids acids such as silica-alumina and synthetic zeolites represented by ZSM-5 type zeolites such as ZSM-5 and ZSM-11, heteropoly acids such as silicotungstic acid, super strong acids such as trifluoromethane sulfonic acid, and super strongly acidic cation exchange resin such as Nafion (trademark, made by E. I. du Pont de Nemours). However, sulfuric acid and natural clay such as activated clay are not preferable because the disproportionation does not proceed substantially.

The temperatures for the disproportionation can be selected in a wide range of 20° to 500° C. with the kind of used catalyst. For example, the temperature range of 20° to 150° C. is suitable for aluminum chloride; 150° to 230° C., for Nafion; and 250° to 500° C., for synthetic zeolite. The disproportionation does not occur at temperatures below the above range, while side reaction such as decomposition occurs at temperatures higher than the above range, neither of which is, accordingly, desirable.

With regard to the type of reaction, any of batchwise and continuous types can be employed. Preferable reaction times are 20 minutes to 10 hours in batchwise reaction and 0.5 to 10 in SV in continuous reaction.

The pressures of disproportionation are not especially limited, however, they are generally in the range of atmospheric pressure to 10 kg/cm$^2$.

In the disproportionation according to the invention, a fraction that is heavier than the starting hydrocarbons is obtained with lighter monocyclic aromatic hydrocarbons such as benzene and lower alkylbenzenes of toluene and ethylbenzene that are lighter than the starting hydrocarbons. It is desirable that, during the disproportionation, the lighter components are continuously removed outside the reaction system because the yield of heavier components can be raised.

In the present invention, a fraction mainly containing triaryldialkanes that are heavier than the starting hydrocarbons and having boiling points in the range of 350° to 450° C., preferably 350° to 420° C., is used as an electrical insulating oil. The fraction boiling above 450° C. is not desirable because the viscosity thereof is too high.

The above triaryldialkanes are represented by the following general formula (II):

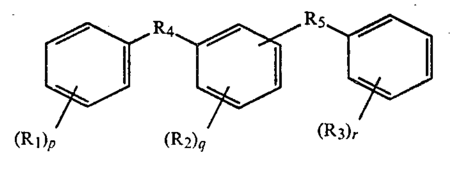

(II)

wherein each of $R_1$, $R_2$ and $R_3$ is a hydrogen atom or a straight chain or branched chain alkyl group; each of $R_4$ and $R_5$ is a straight chain or branched chain alkylene group; and each of p, q and r is an integer from 0 to 3.

The electrical insulating oil of the present invention, i.e. the fraction mainly containing triaryldialkanes contains various kinds of triaryldialkanes including isomers thereof that are represented by the foregoing formula (II) and unknown components. Even though it is difficult to specify the composition of the fraction because the main components are higher molecular weight compounds, it should be noted that excellent electrical characteristics can be obtained owing to the interaction among the triaryldialkanes and also the interaction between the triaryldialkanes and other unknown components, thus the above fraction of the invention can be used as an excellent electrical insulating oil.

The electrical insulating oil of the invention is highly compatible with plastics, especially with polyolefins, more particularly with polypropylene. Accordingly, it is desirable to use the electrical insulating oil of the invention in several oil-filled electrical appliances in which at least a part of insulating or dielectric material thereof is made of plastics.

As the electrical appliances which can be suitably impregnated with the electrical insulating oil of the invention, there are oil-filled capacitors and oil-filled power cables.

In the case of oil-filled capacitors, a metallic foil such as aluminum foil as an electrode and a plastic film or films are put in layers and wound together to form a capacitor element. The element is then impregnated with electrical insulating oil by a conventional method to obtain an electrical capacitor. It is possible to use both the plastic film and conventional insulating paper together. As the plastic films, those made of polyolefins such as polyethylene, polypropylene and polymethylpentene; polyvinylidene chloride, polyester and the like used. Among them, polyolefins are preferable and, especially, polypropylene is more preferable. In place of a metallic foil, a metallic layer that is vacuum-deposited on a film can also be employed as an electrode. As described in the foregoing passage, the capacitors made by using such metallized films are called as MF capacitors. The electrical insulating oil of the invention can be advantageously used for the MF capacitors of this kind.

In the case of oil-filled power cables, plastic films are wound round metal conductors such as copper wire and aluminum wire and they are impregnated with electrical insulating oil by a conventional method. The plastic films are made of polyolefins such as polyethylene, polypropylene and polymethylpentene, polyvinylidene chloride and polyester. Among them, polyolefins are preferably used, where the polyolefin film and insulating paper are wound together, or a composite film that is made by laminating a melt-polyolefin film to insulating paper or by bonding silane-grafted polyolefin film to insulating paper is used, or mixed-fiber paper made of polyolefin fiber and paper pulp is used.

In spite of the higher boiling points of the fraction of the present invention that is obtained by disproportionation, the viscosity and pour point of the fraction are relatively low. Accordingly, this fraction itself can be advantageously used as an electrical insulating oil. In addition, the fraction can be used by mixing at arbitrary ratios with one or more kinds of refined mineral oils, olefin oligomers such as polybutene, alkylbenzenes such as dodecylbenzene, diarylalkanes such as diphenylmethane, phenyltolylethane, phenylxylylethane and phenyl-isopropylphenylethane, triarylalkanes or triaryldialkanes such as styrene trimer, distyrenated xylene and dibenzyltoluene, alkylbiphenyls such as isopropylbiphenyl, alkylnaphthalenes such as diisopropylnaphthalene, phthalic esters such as dioctyl phthalate, and animal or vegetable oils such as castor oil.

The present invention will be described in more detail with reference to the following examples.

EXAMPLE 1

Using aluminum chloride catalyst, alkylation was carried out by reacting benzene with ethylene in a molar ratio (benzene:ethylene) of 5:1 at 130° C. for 1 hour. Unreacted benzene, ethylbenzene and polyethylbenzene were distilled off from the above obtained reaction mixture to recover a by-product oil fraction boiling in the range of 260° to 310° C. (converted to atmospheric pressure).

The composition of this by-product oil fraction was as follows:

| | |
|---|---|
| Diphenylethane | 37% by weight |
| Phenyl-ethylphenylethane | 32% by weight |
| Others | 31% by weight |
| Total | 100% |

(Triaryldialkanes were scarcely contained in the above by-product oil fraction)

Then, 30 g of aluminum chloride was added to 2000 ml of the above by-product oil fraction and it was disproportionated at 80° C. for 5 hours with stirring.

After the disproportionation, the catalyst was deactivated and the disproportionation product was rinsed with water and dried. It was followed by distillation to obtain a $C_6$–$C_9$ monocyclic aromatic hydrocarbon fraction and a heavier fraction as follows:

| Fraction | Boiling Pt. | Recovery |
|---|---|---|
| Lighter fraction | 80 to 160° C. | 5.0% |
| Heavier fraction | 350 to 400° C. | 14.8% |

It was confirmed that the above heavier fraction mainly contained triaryldialkanes by GC-mass spectrum analysis. The properties of the heavier fraction were as follows:

| | |
|---|---|
| Pour point | −27.5° C. |
| Viscosity | 18.5 cSt (at 40° C.) |
| Dielectric breakdown voltage | 70 kV/2.5 mm or above |
| Volume specific resistivity | $9.8 \times 10^{15}$ Ω · cm |
| Dielectric constant | 2.58 (at 80° C.) |
| Dielectric loss tangent | 0.001 (at 80° C.) |

(Capacitor Test)

Aluminum was then deposited on one side surface of an 8 micron thick stretched polypropylene films by a usual vacuum deposition method to obtain a 40 mm wide metallized film with 3 mm margins. Capacitor elements were made by winding this metallized film and they were impregnated with the above heavier fraction by an ordinary method to obtain 7 pieces of MF capacitors of 5 μF in electrostatic capacity. This capacitors were applied with electric voltage at a potential gradient of 130 V/μ to determine the breakdown times of the MF capacitors. However, the capacitors were not broken down after 800 hours, from which fact it was understood that sufficient service life of electric capacitors can be given.

EXAMPLE 2

Using synthetic zeolite ZSM-5, toluene was alkylated with ethylene under the following conditions:

| | |
|---|---|
| Reaction temperature | 500° C. |

-continued

| | |
|---|---|
| Toluene/ethylene | 5 (molar ratio) |
| WHSV | 10 |

After the alkylation, unreacted toluene, ethyltoluene and polyethyltoluene were distilled off from the reaction mixture to obtain a heavier components. The following by-product oil fraction containing diarylalkanes was then recovered from the heavier components.

| By-Product Oil Fraction | |
|---|---|
| Boiling Point | 260–300° C. |
| Composition | % by weight |
| $C_{14}$—$C_{15}$ diarylmethanes | 59.1 |
| $C_{16}$ diarylethane | 25.9 |
| Others | 15.0 |
| Total | 100.0 |
| (Triaryldialkane was scarcely contained) | |

The above by-product oil fraction (2000 ml) was disproportionated at 200° C. for 3 hours under atmospheric pressure with stirring by using 50 g of super strongly acidic cation exchange resin (trademark: Nafion made by du Pont de Nemours). During the disproportionation, the produced lighter fractions of $C_6$–$C_9$ monocyclic aromatic hydrocarbons such as benzene and toluene were removed continuously from the reaction system.

After the disproportionation, the catalyst was filtered off and 1550 ml of the filtrate was distilled further to recover the following heavier fraction containing triaryldialkanes. Incidentally, as the lighter fraction that were removed during the disproportionation was also collected, it is shown together in the following:

| Fraction | Boiling Pt. | Recovery |
|---|---|---|
| Heavier fraction | 350 to 400° C. | 29.5% |
| Lighter fraction | 80 to 160° C. | 9.9% |

It was confirmed that the above heavier fraction mainly contained triaryldialkanes by GC-mass spectrum analysis. The properties of the heavier fraction were as follows:

| | |
|---|---|
| Pour point | −35° C. |
| Viscosity | 16.8 cSt (at 40° C.) |
| Dielectric breakdown voltage | 70 kV/2.5 mm or above |
| Volume specific resistivity | $1.0 \times 10^{16}\ \Omega \cdot cm$ |
| Dielectric constant | 2.57 (at 80° C.) |
| Dielectric loss tangent | 0.001 (at 80° C.) |

(Capacitor Test)

By impregnating with the above heavier fraction, MF capacitors were prepared in the like manner as Example 1. The breakdown test was also carried out by applying electric voltage. The capacitors had sufficient service life because they were not broken down after 800 hours' test.

COMPARATIVE EXAMPLE

Impregnated MF capacitors were made in the like manner as Example 1 by using the by-product oil fractions (not disproportionated) that were used as the starting materials for the disproportionation in Examples 1 and 2. After that, dielectric breakdown test was carried out by applying electric voltages. As a result, all the capacitors were broken down within 73 hours. Incidentally, this time is the average of 5 breakdown times with omitting the maximum and minimum times in 7 values.

What is claimed is:

1. An electrical insulating oil which comprises a fraction having boiling points in the range of 350° to 450° C. that is prepared by disproportionating a by-product oil fraction having boiling points in the range of 260° to 320° C. and containing diarylalkanes at temperatures in the range of 20° to 500° C. in the presence of a disproportionation catalyst, wherein said by-product oil fraction is obtained in the process to produce alkylated benzene or toluene by alkylating benzene or toluene with ethylene in the presence of an alkylation catalyst.

2. The electrical insulating oil in claim 1, wherein said disproportionation catalyst is a Lewis acid.

3. The electrical insulating oil in claim 2, wherein said Lewis acid is aluminum chloride.

4. The electrical insulating oil in claim 1, wherein said disproportionation catalyst is a super strong acid.

5. The electrical insulating oil in claim 1, wherein said alkylation catalyst is a Lewis acid.

6. The electrical insulating oil in claim 5, wherein said Lewis acid is aluminum chloride.

7. The electrical insulating oil in claim 1, wherein said alkylation catalyst is a solid acid catalyst.

8. The electrical insulating oil in claim 7, wherein said solid acid catalyst is a synthetic zeolite catalyst.

9. The electrical insulating oil in claim 1, wherein said fraction having boiling points in the range of 350° to 450° C. mainly contains triaryldialkanes.

10. An oil-filled electrical appliance which is characterized in that at least a part of its electrical insulating material or dielectric material is made of plastic material and is impregnated with an electrical insulating oil which comprises a fraction having boiling points in the range of 350° to 450° C. that is prepared by disproportionating a by-product oil fraction having boiling points in the range of 260° to 320° C. and containing diarylalkanes at temperatures in the range of 20° to 500° C. in the presence of a disproportionation catalyst, wherein said by-product oil fraction is obtained in the process to produce alkylated benzene or toluene by alkylating benzene or toluene with ethylene in the presence of an alkylation catalyst.

11. The oil-filled electrical appliance in claim 10, wherein said disproportionation catalyst is a Lewis acid.

12. The oil-filled electrical appliance in claim 11, wherein said Lewis acid is aluminum chloride.

13. The oil-filled electrical appliance in claim 10, wherein said disproportionation catalyst is a super strong acid.

14. The oil-filled electrical appliance in claim 10, wherein said alkylation catalyst is a Lewis acid.

15. The oil-filled electrical appliance in claim 14, wherein said Lewis acid is aluminum chloride.

16. The oil-filled electrical appliance in claim 10, wherein said alkylation catalyst is a solid acid catalyst.

17. The oil-filled electrical appliance in claim 16, wherein said solid acid catalyst is a synthetic zeolite catalyst.

18. The oil-filled electrical appliance in claim 10, wherein said oil-filled electrical appliance is an oil-filled capacitor.

19. The oil-filled electrical appliance in claim 18, wherein said oil-filled capacitor is made by winding a metallized plastic film.

20. The oil-filled electrical appliance in claim 10, wherein said oil-filled electrical appliance is an oil-filled power cable.

21. The oil-filled electrical appliance in claim 10, wherein said plastic material is polyolefin.

22. The oil-filled electrical appliance in claim 21, wherein said polyolefin is polypropylene.

23. The oil-filled electrical appliance in claim 10, wherein said fraction having boiling points in the range of 350° to 450° C. mainly contains triaryldialkanes.

* * * * *